United States Patent [19]

Fleck

[11] Patent Number: 5,015,375

[45] Date of Patent: May 14, 1991

[54] RECHARGEABLE FILTER ASSEMBLY

[75] Inventor: Steven W. Fleck, Tampa, Fla.

[73] Assignee: MCF Systems, Inc., Tampa, Fla.

[21] Appl. No.: 394,546

[22] Filed: Aug. 16, 1989

[51] Int. Cl.$^5$ .................. B01D 27/08; B01D 29/21
[52] U.S. Cl. ........................... 210/232; 210/450;
210/457; 210/484; 210/493.5; 55/500; 55/502; 55/521
[58] Field of Search ............ 210/232, 440, 434, 444, 210/493.1, 493.3, 493.5, 450, 470, 484, 485, 437, 457; 55/500, 502, 521

[56] References Cited

U.S. PATENT DOCUMENTS

| | | | |
|---|---|---|---|
| 2,559,133 | 7/1951 | Schultz | 210/470 |
| 2,731,155 | 1/1956 | James | 210/470 |
| 3,187,896 | 6/1965 | Wilkinson | 210/470 |
| 3,189,179 | 6/1965 | McMichael | 210/489 |
| 4,303,426 | 12/1981 | Battis | 210/232 |

*Primary Examiner*—Robert A. Dawson
*Assistant Examiner*—Wanda L. Millard
*Attorney, Agent, or Firm*—Pettis & McDonald

[57] ABSTRACT

A rechargeable filter assembly for removal of contaminants from liquids of all types, particularly dry cleaning solvents comprising three nested and spaced apart concentric perforated metal cylinders defining an inner cavity and an outer cavity held in spatial relationship by a base plate and removable lid. With the lid and outer perforated cylinder (exterior shell) removed, a removable and disposable filter unit may be placed within the outer cavity and similar, or different, filter medium may be placed within the inner cavity. The gaskets of the filter unit in conjunction with the lid, the base, the conduit, exterior shell and the inner perforated cylinder provide seals which prevent liquids from bypassing the filter unit.

13 Claims, 4 Drawing Sheets

RECHARGEABLE FILTER ASSEMBLY

BACKGROUND OF THE INVENTION

1. Field of the Invention

The present invention relates to a reusable filter assembly containing removable and disposable filter elements, usually comprising a pleated paper element and an inner cavity filled with granular activated carbon and/or other materials. The filter assembly may be used to remove contaminants from liquids of all types, but it particularly addresses the filtration of dry cleaning solvent.

2. Description of the Prior Art

Until recently, most filters, including those used within the dry cleaning industry, were manufactured in a sealed housing made of metallic or other rigid materials that enclose the various filter elements such as paper, activated charcoal and clay pellets. The filter materials are designed to absorb various contaminants from liquids used for various purposes, e.g. cleaning and lubricating. Eventually, the filters become saturated and are unable to absorb any further contaminants and must be replaced. Since the filter assemblies are sealed, the complete assembly must be removed and a new one put in its place.

Disposal of this entire assembly creates several problems. Often the contaminants contained within a saturated filter unit are hazardous in nature and must be extracted from the sealed filter assembly prior to their proper disposal in a land fill. Disposal of the housing within a land fill adds non-degradable bulk to the land fill. The disposal of these rigid housings is expensive, and a waste of natural resources.

The following inventions are examples of sealed filters used in the dry cleaning industry:

| | |
|---|---|
| Brucken, et al. | U.S. Pat. No. 3,178,025 |
| McMichael | U.S. Pat. No. 3,189,179 |
| Suchy | U.S. Pat. No. 3,219,191 |
| Hartley | U.S. Pat. No. 3,263,812 |
| Tuffnell | U.S. Pat. No. 3,493,117 |
| Giampalmi, Jr., et al. | U.S. Pat. No. 3,730,347 |
| Bauer | U.S. Pat. No. 3,836,005. |

An extensive field for utilization of filters is related to the filtration of the lubricating oil used within internal combustion engines. In this field, devices incorporating reusable filter elements have been known for a number of years; however, these filters are of a very different structure than those used within the dry cleaning industry as dictated by their different use. Examples of this type filter follow:

| | |
|---|---|
| Eberle | U.S. Pat. No. 3,085,688 |
| Hultgren | U.S. Pat. No. 3,260,367 |
| Wood, et al. | U.S. Pat. No. 3,282,429 |
| Scavuzzo, et al. | U.S. Pat. No. 3,333,703 |
| Johnson | U.S. Pat. No. 3,615,018 |
| Russo | U.S. Pat. No. 3,630,374 |
| Cote, Jr. | U.S. Pat. No. 4,228,011 |
| Medley, III | U.S. Pat. No. 4,802,979. |

The development and widespread use of reusable filter assemblies within the dry cleaning industry have met with problems which limit complete acceptance of their use. One such problem relates to contamination of the filtered fluid during removal and replacement of the filter elements. Two examples of inventions intended to resolve this type problem are as follows:

| | |
|---|---|
| Cooper | U.S. Pat. No. 4,133,763 |
| Tafara | U.S. Pat. No. 4,253,959. |

Another problem relates to ease of access for removal of the filters:

Smith, U.S. Pat. No. 4,138,337, discloses a system for separating the filter assembly into two parts for ease of removal from the process housing;

Cook, U.S. Pat. No. 3,595,398, utilizes a hinged side opening;

Tokar, et al., U.S. Pat. No. 4,647,373, utilizes a "peel away" paper filter medium; and Ball, U.S. Pat. No. 3,542,202, utilizes a quick release mounting system which attaches the cartridge to the housing.

Another major problem relates to proper sealing between the elements and the filter assembly to prevent unfiltered liquid from bypassing the filter elements and re-entering the treated fluid stream. Close, U.S. Pat. No. 3,486,626, addresses this problem by providing a complex clamping and sealing means. Barrington, U.S. Pat. No. 4,810,379, seeks to solve this problem by providing two sealing means at either end of the paper filter element with one of the sealing means being removable from the core in order to permit replacement of the element. This invention however does not provide protection for the paper filter assemblies during insertion in the housing. Brucken, et al., U.S. Pat. No. 3,198,334 discloses a removable filter to be used in a home washer/dry cleaning apparatus in which the sealing system is incomplete as fluid is permitted to bypass the filter system.

SUMMARY OF THE INVENTION

The present invention provides a reusable filter assembly in which disposable filter elements are removably inserted to provide a filtering medium for removing contaminants from liquids.

Most simply stated, the reusable filter assembly comprises a circular base plate having an aperture passing through its center point, and a flange extending upwardly along the periphery of the base plate. In addition, an annular groove is cut into the base plate concentrically spaced between the peripheral edge of the base plate and the bas plate aperture. One end of a perforated conduit having a cross section larger than the base plate aperture is attached normal to the base plate such that the two apertures, the aperture of the base plate and that of the conduit, are in fluid flow communication.

A hollow perforated support cylinder having two open ends is placed over, around and spaced from the conduit such that the support cylinder and the conduit define an inner cavity therebetween. One end of the support cylinder is inserted and removably fastened within the annular groove in the base plate.

A removable filter unit comprises a pleated paper element formed into a hollow cylinder that has a first and a second gasket each of which is sealingly fastened to all the respective first and second end edges of the pleated paper elements. Each of the gaskets has an aperture therethrough. The second gasket is adapted such that the filter element may be removably inserted over and around the support cylinder. The first gasket is adapted such that the gasket fits over the conduit and rests upon the support cylinder. At the same time that the first gasket rests upon the support cylinder, the second gasket is placed adjacent to the base plate. The second gasket is sized to extend beyond the periphery of the paper element and fit snugly against the flange of the base plate.

The reusable filter assembly has a circular lid with a aperture extending through the center point, the diameter of the aperture is slightly larger than the first end of the conduit, so that the lid will fit over the conduit. The circular lid has the same peripheral diameter as the base plate and a continuous flange along the peripheral edge that extends toward the filter body.

The filter assembly also has a perforated cylindrical exterior shell having at least one open end and a diameter slightly less than that of the base plate or the lid. When the exterior shell is placed over and around the support cylinder and spaced therefrom, an outer cavity is formed in which the filter unit rests. The diameter of the periphery of the first gasket of the filter unit is slightly less than that of the exterior shell so the shell may slide snugly over the first filter gasket.

A bed of activated carbon granules may be inserted within the inner cavity formed between the conduit and the support cylinder. The granules are used to remove very fine particles such as dyes. Other types of filter material may be placed within this inner cavity.

When the lid is attached to the conduit, the gasket of the filter unit in conjunction with the lid, the base, the conduit and the support cylinder form several continuous circular seals that prevent fluid from bypassing the paper filter.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with accompanying drawings, in which.

Similar reference characters refer to similar parts throughout the several views of the drawings.

DETAILED DESCRIPTION

Figure 1:
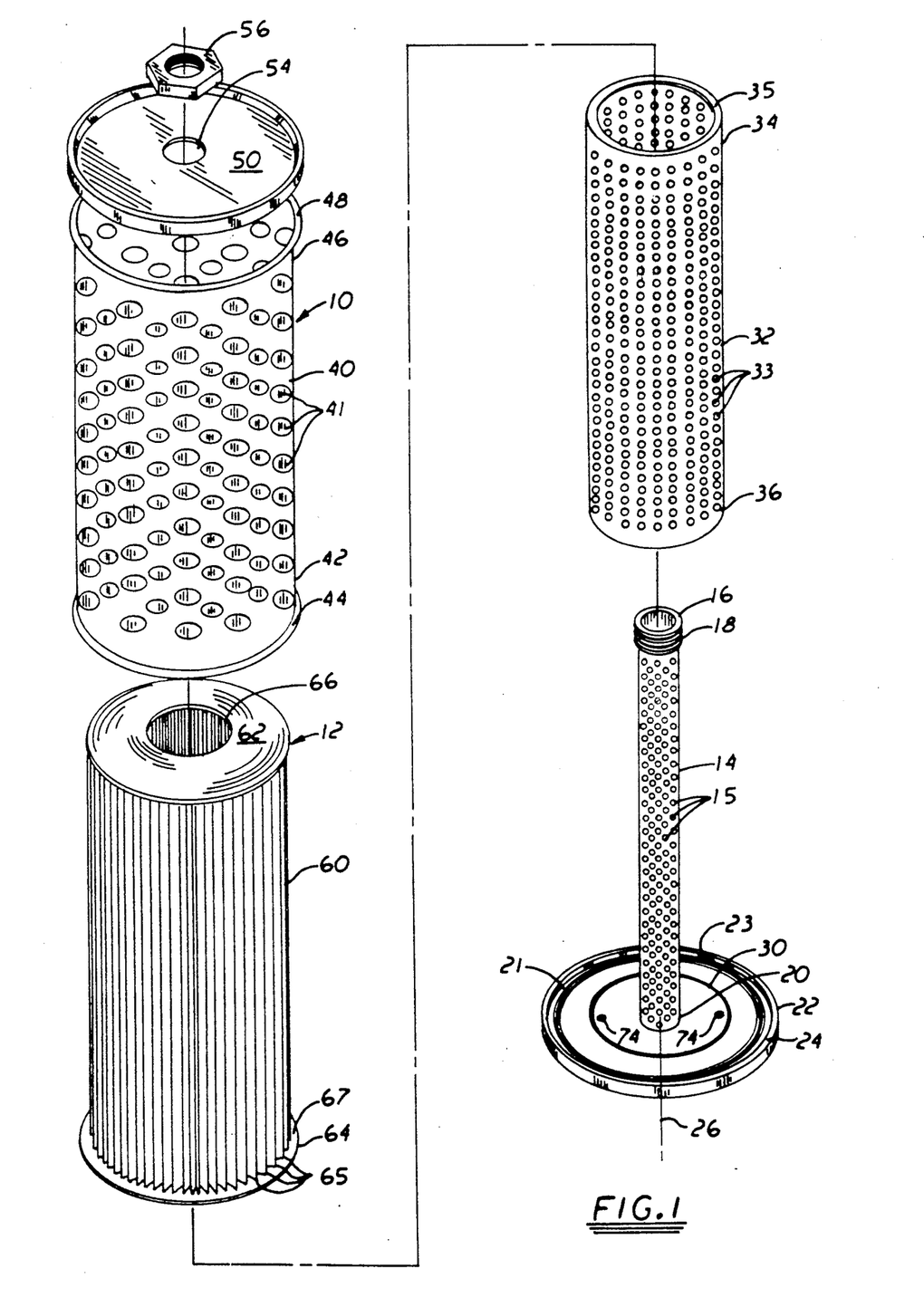
FIG. 1 is an exploded perspective view of one embodiment of the rechargeable filter assembly including the replaceable filter unit.
Figure 2:
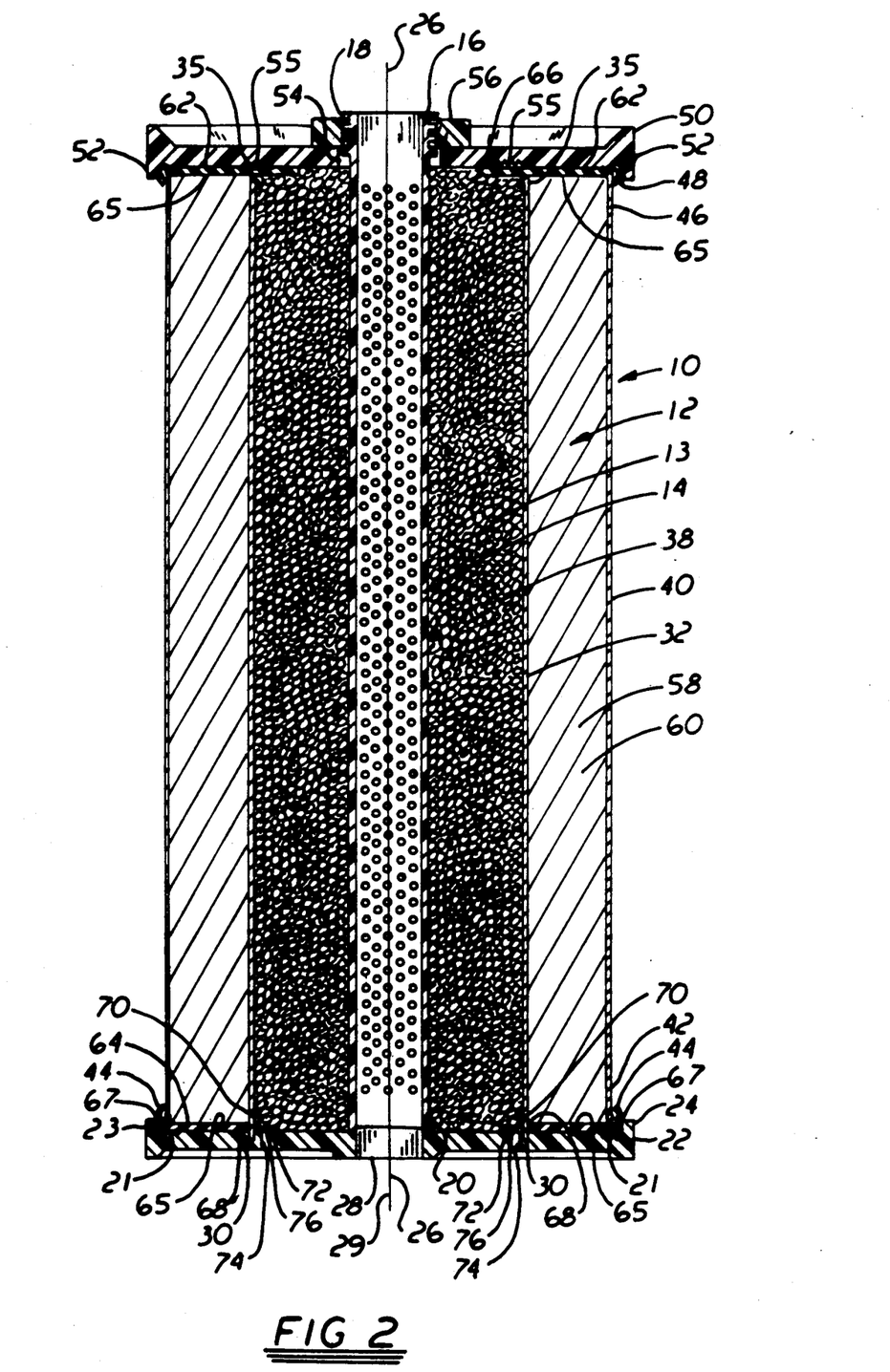
FIG. 2 is a sectional view of one embodiment of the rechargeable filter assembly of FIG. 1, the filter unit and a granular filter medium.

An embodiment for the Rechargeable Filter Assembly is illustrated in drawing FIGS. 1 and 2, with the Rechargeable Filter Assembly generally shown as 10. FIG. 1 illustrates the relationship of the filter assembly 10 with a filter unit shown generally as 12. FIG. 2 is a cross section of the assembled filter assembly 10 further showing the filter assembly's relationship with the filter unit 12 and a particulate filter 13.

Referring first to the view of FIG. 1, it can be seen that this embodiment of the rechargeable filter assembly 10 comprises a perforated conduit 14, with a first end 16 which has threads 18 formed thereon and a second end 20 which is fastened generally normal to a base plate 22. The base plate 22 is circular with a flange 24 extending upwardly from the peripheral edge 23 of the base plate 22. An annular band of roughened area 21 is located adjacent to the flange 24 of the base plate 22. The roughened surface area 21 consists of a circular band of triangularly shaped ridges projecting upward from the surface of the base plate 22 and into the bottom gasket 64, when the gasket 64 is compressed against the base plate 22. The rechargeable filter assembly 10 has a longitudinal axis 26. As can be better seen in FIG. 2, the base plate 22 has a circular base aperture 28 therethrough, such that the circular aperture's axis 29 is aligned with the longitudinal axis 26 of the filter assembly 10. The diameter of the base aperture 28 of base plate 22 is equal to the interior diameter of the perforated conduit 14, thereby permitting fluid flow communication between the perforated conduit 14 and the base aperture 28 through the base plate 22.

In addition, it is more clearly illustrated in FIG. 1 that a circular groove 30 has been made in the base plate concentrically spaced between the peripheral edge 23 of the base plate 22 and the perforated conduit 14. A hollow perforated support cylinder 32 having a first open end 34 and a second open end 36 is placed over, around and spaced from the conduit 14 such that the second end 36 of the support cylinder 32 is inserted and removably fastened within the annular groove 30 in the base plate 22. The support cylinder 32 and the conduit 14 define an inner cavity 38. The first end 34 of the support cylinder 32 is bent inwardly to form a flange 35.

The filter unit shown generally as 12 is comprised of an annular pleated paper element 60, and a filter element sealing means attached to each end of the paper element 60 comprising a first gasket 62, and a second gasket 64. The gaskets 62 and 64, constructed of polyester material, are sealingly molded to the peripheral edges 65 of the paper element 60 while the gasket material is in liquid form prior to hardening into a soft flexible gasket material. The tight seal that is formed prevents the passage of any fluid between the ends of the paper filter element 65 and the gaskets 62 and 64. The gaskets 62 and 64 also provide a filter unit sealing means to seal the filter unit 12 to the base plate 22 and the lid 50. The filter unit has a first axial aperture 66 passing through the first gasket 62, and a second axial aperture 68 passing through the second gasket 64. The diameter of the periphery of the second gasket 64 is sized to fit snugly within the flange 24 of the base plate 22, thereby extending out beyond the pleated paper element 60 to provide a surface 67 upon which flange 44 of exterior shell 40 may rest. The diameter of aperture 68 of second gasket 64 is dimensioned so that the gasket may fit snugly around the support cylinder 32.

The hollow perforated exterior shell 40 has two open ends, the second end 42 having bent outwardly to form a second flange 44 and the first end 46 having bent outwardly to form a first flange 48. The diameter of the cylindrical exterior shell 40 is sized so that the flange 44 fits snugly inside the flange 24 of the base plate 22. The diameter of the periphery of the first gasket 62 is dimensioned to fit snugly within the exterior shell 40 rather than extending to the flange 52 of the lid 22 so that the shell 40 may be removed from around the filter unit 12. The aperture 66 of the first gasket 62 is dimensioned substantially less than the diameter of the support cylinder 32 and greater than the diameter of the conduit 14 permitting the first gasket 62 to easily fit over the conduit 14 and rest upon the support cylinder 32.

The filter assembly 10 has a circular lid 50 which is generally the same size as the base plate 22, and has an axial lid aperture 54 therethrough which is slightly larger in diameter than the exterior diameter of the threads 18 of the conduit 14. A circular band of roughened area 55 has been created on the lid 50 adjacent to the flange 35 of the support cylinder 32 to provide improved contact between the flange 35, the gasket 62 and the lid 50. The roughened area 55 consists of a circular band of triangularly shaped ridges extending downward from the surface of the lid into the gasket 62, when the gasket 62 is squeezed between the first flange 48 of the exterior shell 40 and the lid 50. The lid 50 may then be placed over the conduit 14 resulting in the conduit threads 18 projecting through the lid 50, which permits the attachment of a nut 56 to the threads 18. When the lid 50 is placed over the conduit 14, the lid flange 52 fits snugly over the first flange 48 of the exterior shell 40. The exterior shell 40 is spaced from the support cylinder 32 to define an outer cavity 58 in which the filter unit 12 rests.

The filter assembly 10 is preferably constructed of stainless steel for strength, easy cleaning and corrosion resistance; however, plastics or aluminum, among other material, may be substituted. The pleated paper element 60 of the filter unit 12 is constructed of conventional porous paper manufactured specifically for various filtration purposes and the gaskets are made from fiber felt or, preferably, polyester. In this embodiment, the perforations 41 passing through the exterior shell 40 are 5/16" diameter on 7/16" staggered center, 50% open area. The perforations 15 through the conduit 14 and the perforations 33 through the support cylinder 32 are 0.027' in diameter, 19% open area, small enough to retain granular activated charcoal filter material placed within the inner cavity 38; however, various filter materials may be placed within the inner cavity 38 or outer cavity 58 requiring that the perforations be made smaller or larger to insure proper retention of the filtering materials or to adjust the speed of fluid flow through the filter assembly 10.

Having thus set forth this embodiment for the filter assembly 10, it is to be remembered that the preferred embodiment follows. Attention is now invited to a description of the assembly of the filter assembly 10 and its use. The conduit 14 and the base plate 22 already comprise a single unit, since the conduit 14 has been affixed to the base plate. The support cylinder 32 is then placed over the conduit 14 so that the second end 36 of the support cylinder 32 is inserted into the groove 30. The support cylinder 32 may be removably fastened to the base plate 22 by attaching right angle tabs 70 at spaced intervals about the second end 36 of the support cylinder 32. The base leg 72 of the right angle tab 70 has aperture 76 made therethrough which aligns with the aperture 74 made through the base plate 22. To one skilled in the art of filter design, it would be obvious that a bolt (not shown) may be passed through aperture 76 of the base leg 72 of the right angle tab 70 and through aperture 74 of the base plate 22 and a nut (not shown) fastened thereon, whereby the support cylinder 32 is removably fastened to base plate 22.

A bed of activated carbon granules 13, the preferred embodiment, or other filter material may be placed within the inner cavity 38.

The filter assembly 10 is now ready to receive the filter unit 12 within the outer cavity 58. As the filter unit 12 is inserted around the support cylinder 32, the second gasket 64 fits snugly against the exterior surface of the support cylinder 32. The second gasket 64 extends beyond the pleated paper element 60 providing a surface 67 with which the flange 44 of the exterior shell 40 may make sealing contact. The filter unit 12 is pushed snugly against the base plate 22. The exterior shell 40 is now placed over and spaced from the support cylinder 32 such that it encircles the filter unit 112. The shell is pressed downward so that the flange 44 is seated within the base plate flange 24 and pressed against the extended surface 67 of the second gasket 64.

Now the lid 50 may be attached to the filter assembly 10 by placing it over the conduit 14 and pressing downward ensuring that flange 48 of the exterior shell 40 fits snugly within the flange 52 of the lid 50. As the nut 56 is tightened over the threads 18 of the conduit 14, the first gasket 62 is squeezed between the flange 35 of the support cylinder 32 and the roughened area 55 of the lid 50 and the flange 44 of the exterior shell 40 squeezes the gasket surface 67 of the second gasket 64 against the roughened surface 21 of base plate 22 to form two continuous circular seals, which prevent any fluid from bypassing the paper filter 60.

The filter assembly may now be mounted within a dry cleaning or other similar system. When the filter unit and the activated carbon granules are saturated with contaminants, the filter assembly is removed from the cleaning system. The nut 56 is removed and then the lid 50 may be removed followed by the exterior shell 40 which permits access to the filter unit 12 and the carbon granules 13. Fresh carbon granules 13 and a new filter unit 12 are inserted, and the filter assembly 10 is reassembled. Now the filter unit 12 and the carbon granules 13 may be treated if necessary and disposed of properly.

Figure 3:
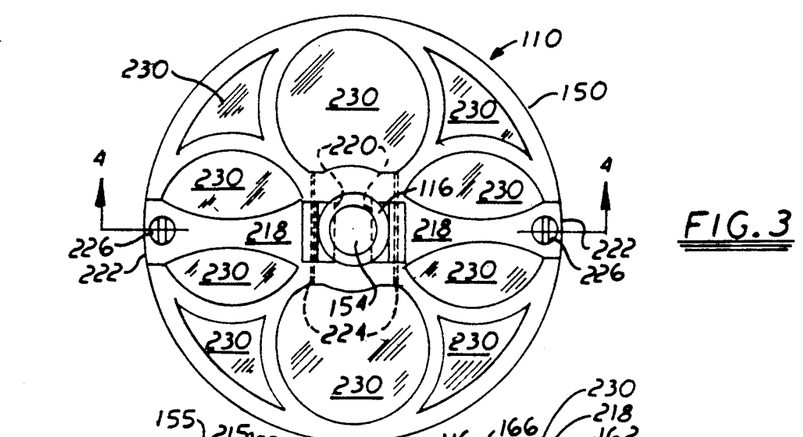
FIG. 3 is a plan view of the preferred embodiment of the rechargeable filter assembly.
Figure 4:
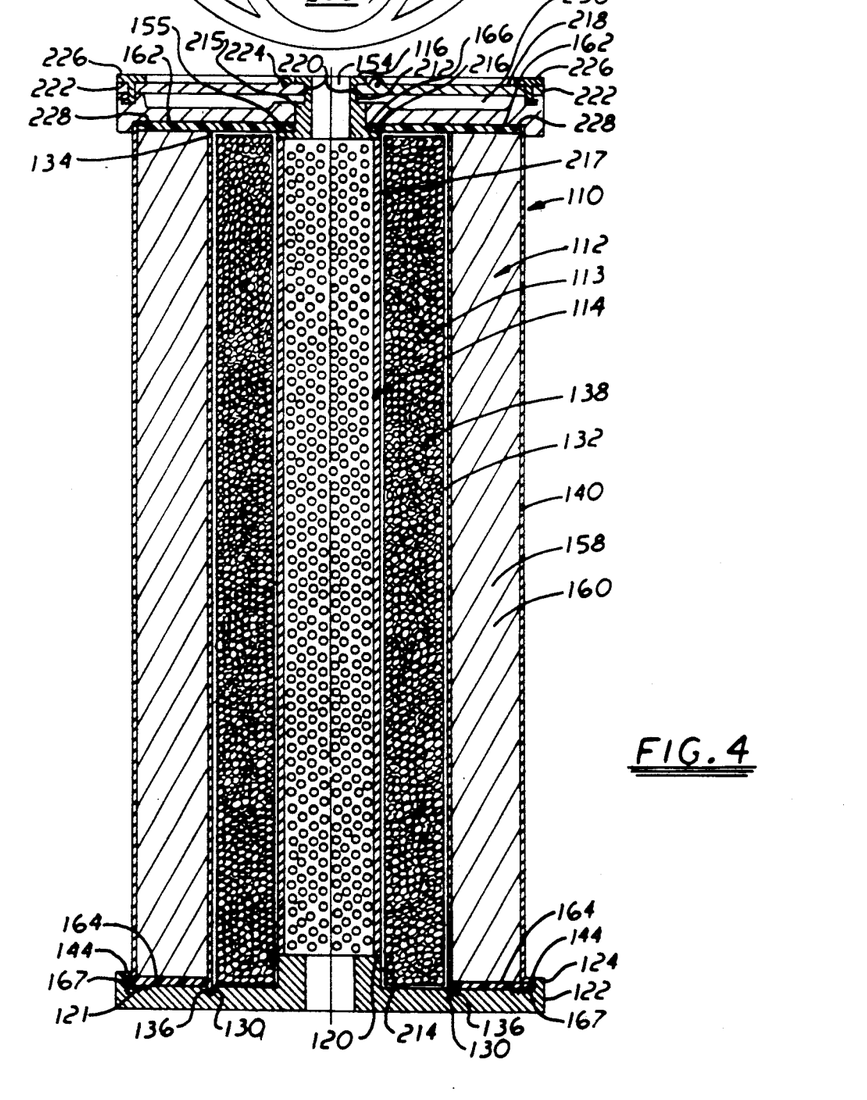
FIG. 4 is a sectional view of the preferred embodiment of the rechargeable filter assembly shown in the sealed position taken along line 4—4 of FIG. 3.
Figure 5:
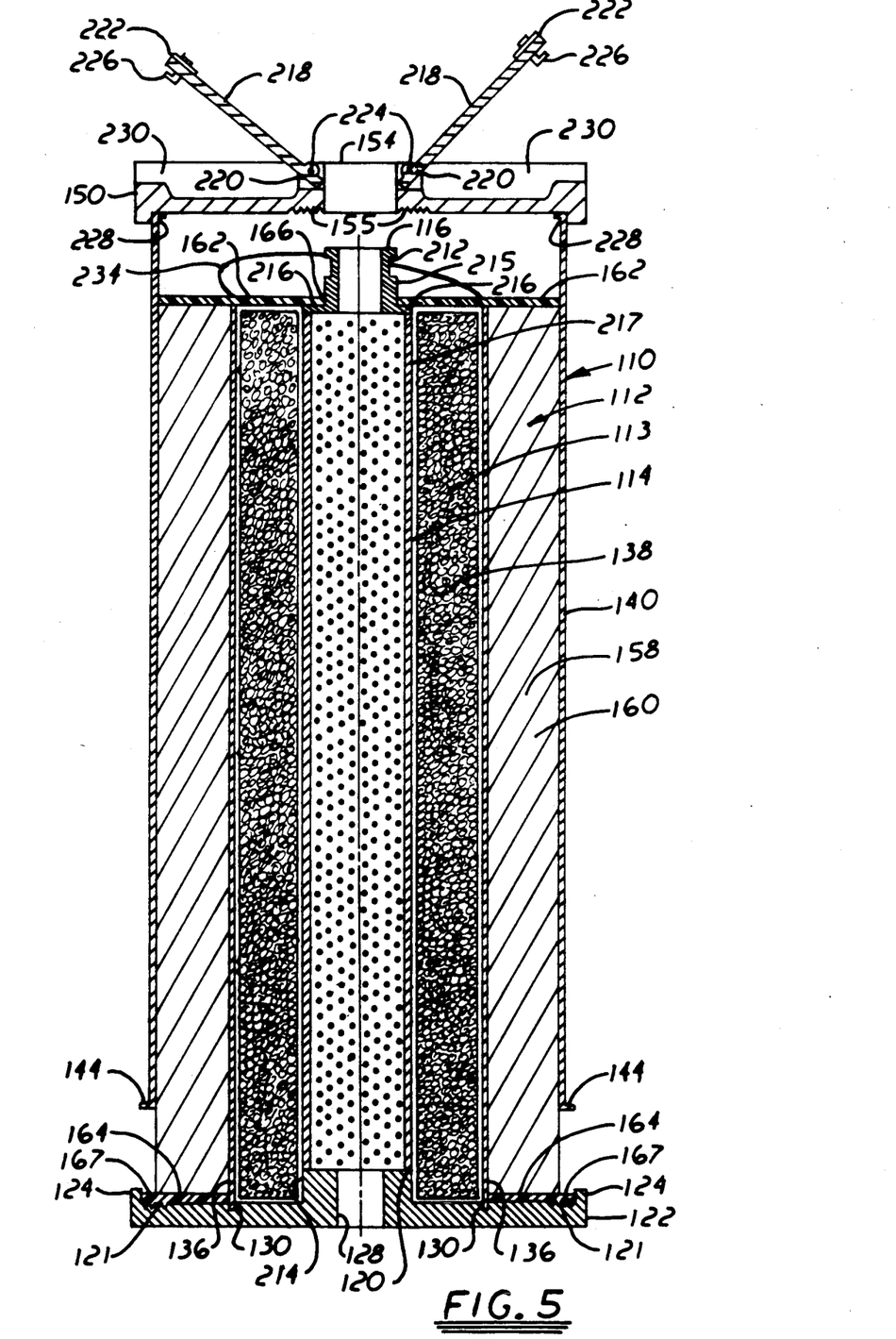
FIG. 5 is a sectional view similar to that of FIG. 4, of the preferred embodiment of the rechargeable filter assembly shown in a partially open position.

The preferred embodiment for the rechargeable filter assembly is illustrated in drawing FIGS. 3, 4 and 5. The structure which corresponds to the embodiment above is identified by like numbers in the 100 series, with the preferred embodiment of the rechargeable filter assembly generally shown as 110. Numbers within the 200 series are used to indicate new structure within the preferred embodiment.

Referring first to the view of FIGS. 4 and 5, it can be seen that the preferred embodiment of the rechargeable filter assembly 110 comprises a perforated conduit 114, having an annular slot 212 cut into the exterior wall proximal to the first end 116 of the perforated conduit 114. The second end 120 of the perforated conduit 114 is fastened generally normal to an annular raised portion 214 of the base plate 122. With the exception of the raised annular portion 214 of the base plate 122, the base plate 122 is the same as described in the previous embodiment, including the upward flange 124, the circular base aperture 128, the annular groove 136 and the roughened area 121. In the preferred embodiment, the base plate 122 is constructed of aluminum, and the annular raised portion 214 is provided to increase the strength of the base plate 122, and to provide a proper fit for installing assembly 110 into a dry cleaning system.

In the preferred embodiment, the perforated conduit 114 has a first section 215 and a second section 217. The diameter of the first section 215 is less than that of the second section 217 creating a shoulder 216 where the two sections join. The shoulder 216 provides an area upon which the gasket 162 will rest.

The hollow perforated support cylinder 132 is placed over, around, and spaced from the conduit 114 such that the second end 136 is inserted within the annular grove 130 in the base plate 122. However, since in the preferred embodiment, the perforated conduit 114 has a larger diameter, the inner cavity 138 defined by the support cylinder 132 and the perforated conduit 114 has a reduced volume. The first end 134 of the support cylinder 132 remains straight without the attachment of a flange.

The filter unit, shown generally as 112 in FIGS. 4 and 5, is basically constructed as described within the above embodiment, with only one minor difference. In the preferred embodiment, the first gasket 162 has an axial aperture 166 whose diameter is sized to fit snugly around the first end 116 of the perforated conduit 114, whereby the gasket 162 will fully contact the shoulder 216 of the perforated conduit 114.

In FIGS. 3, 4 and 5, one sees the circular lid 150 of the filter assembly 110. The lid 150 is now attached to the conduit 114 by the movement of two handles 218 from an open position, as shown in FIG. 5, to a sealed position, as shown in FIG. 4. The handles have a first end 220 and a second end 222. The first end 220 is pivoted about a pin 224 from an open position to a sealed position so that the first ends 220 engage a segment of the annular slot 212. A commonly known latching mechanism 226 is provided to lock the handles 218 into the closed position. In the preferred embodiment, the exterior shell 140 has an upper flange 228 which is formed inwardly and used t attach the exterior shell 140 to the lid 150, such that when the lid is removed from the filter assembly 110, the exterior shell 140 is removed at the same time. In the preferred embodiment, the exterior shell 140 also has a flange 144 which is formed at generally a right angle to the exterior shell 140. The lid 150 has a number of areas 230 which are indentations or pockets from which the metal has been removed to provide access to the handles 218 and to reduce the weight of the lid 150. A circular band of roughened area 155 has been provided on the interior surface of the lid 150 adjacent to the lid aperture 215. The roughened area 155 consists of a circular band of triangularly shaped ridges extending downward from the surface of the lid 150 into the gasket 162, when the gasket 162 is squeezed between the annular shoulder 216 of the conduit 114 and the lid 150.

A pull cord 234 has been attached to the filter unit 112 to aid in its removal from the filter assembly 110, as seen in FIG. 5.

The filter assembly 110 is preferably constructed of stainless steel for strength, easy cleaning and corrosion resistance; however, in this preferred embodiment, in order to provide decreased weight, aluminum has been used to construct the base plate 122, the lid 150, and the perforated conduit 114. Again, other materials may be substituted as desirable. In the preferred embodiment, the perforations 141 passing through the exterior shell, the support cylinder 132 and the conduit 114 remain the same as described in the above embodiment of assembly 10.

Having thus set forth a preferred construction for the filter assembly 110, it is to be remembered that this is but a preferred embodiment and changes in the construction may be made. The conduit 114 and the base plate 122 comprise a single unit, since the conduit 114 has been affixed to the raised annular portion 214 of the base plate 122. The support cylinder 132 is placed over the conduit 114 so that the second end 136 of the support cylinder 132 is inserted into the groove 130.

The support cylinder 132 and the conduit 114 define an inner cavity 138. A bed of activated carbon granules 113, or other filter material may be placed within that inner cavity 138.

The filter assembly 110 is now ready to receive the filter unit 112 within what will become the outer cavity 158 upon the installation of the exterior shell 140. As the filter unit 112 is inserted around the support cylinder 132, the second gasket 164 fits snugly against the exterior surface of the support cylinder 132. The second gasket 164 extends beyond the pleated paper element 160 of the filter unit 112, providing a surface with which the flange 144 of the exterior shell 140 may make sealing contact. The filter unit 112 is pushed snugly against the base plate 122.

Now the lid 150 with the exterior shell 140 attached may be placed over the filter unit 112 such that the first end 116 of the perforated conduit 114 will extend into the lid aperture 215. To be installed properly, the handles 218 must be in the open position as shown in FIG. 5 and the flanges 144 of the exterior shell 140 must be seated within the base plate flange 124. When the lid 150 is generally seated, the handles 218 may be pivoted downward into the sealed or closed position as shown in FIG. 4 such that the first end 220 of the handles 218 make contact with a segment of the annular slot 212. By forcing the handles 218 into the sealed position, the lid is forced downward pressing the exterior shell's flange 144 against the extended surface 167 of the second gasket 164 and against the roughened area 121 of the base plate 122 to form a continuous circular seal and prevent fluid from bypassing the filter unit. In addition, the downward movement of the lid 150 squeezes the first gasket 162 between the roughened area 155 of the lid 150 and the shoulder 216 of the perforated conduit 114, creating a continuous circular seal which also prevents fluid from bypassing the paper filter 160. The filter assembly may now be mounted within a dry cleaning or other similar system. When the filter unit and the activated carbon granules are saturated with contaminants, the lid 150 and the exterior shell 140 are removed by releasing the locks 226 and raising the handles 218, thus disengaging the first end 220 of the handles 218 from the annular slot 212 of the conduit 114. This frees the lid 150 from the filter assembly 110. After the lid 150 and the exterior shell 140 are removed, the filter unit 112 becomes accessible and may be removed by pulling upon the filter cord 234. After the filter unit 112 is removed, access is gained to the inner cavity 138 so that the carbon granules, or other filter medium, may be removed. Fresh carbon granules 113 and a new filter unit 112 are then inserted and the filter assembly 110 reassembled.

It will thus be seen that the objects set forth above, among those made apparent from the preceding description, are efficiently attained, and, since certain changes may be made in the above article without departing from the scope of the invention, it is intended that all matter contained in the above description, or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, I claim:

1. A rechargeable filter assembly comprising:
   a reusable perforated conduit having a first and a second open end;
   a base plate affixed to said second end of said conduit, said base plate having a base aperture formed therethrough and said conduit being in fluid flow communication with said base aperture;
   a reusable hollow perforated support cylinder having a first open end and a second open end, said support cylinder surrounding said conduit and spaced therefrom, said support cylinder and said conduit defining an inner cavity therebetween, and one of said ends of said support cylinder being removably attached to said base plate;
   a reusable perforated cylindrical exterior shell having at least one open end, said exterior shell surrounding said support cylinder being removably connected to said base to define an outer cavity therebetween;
   a lid having a lid aperture therethrough, said lid removably attached to said first end of said conduit and removably connected to said support cylinder;
   a cylindrical filter unit having a first end and a second end, said filter unit having a first and second filter unit sealing means on said first and said second ends respectively, and said filter unit having an opening therethrough, said filter unit adapted to be removably inserted onto and around said support cylinder within said outer cavity, whereby said second sealing means of said filter unit is adjacent to said base plate and said first sealing means is adjacent to said lid of said filter assembly;
   a lid attaching means for removably attaching said lid to said conduit;
   a lid sealing means for removably sealing said lid to said filter unit wherein said perforated conduit further comprises a first section including said first end of said conduit, a second section including said second end of said conduit, and an annular shoulder interposed between said first and said second sections, said first section having a diameter less than said second sections, such that when said filter unit is inserted within said outer cavity said filter unit sealing means of said first end of said filter unit rests upon said shoulder, and when said lid is attached to said conduit by said lid attaching means, said filter unit sealing means of said first end of said filter unit is sealingly squeezed between said lid and said shoulder, whereby fluid is prevented from bypassing the filter medium;
   a base plate sealing means for removably sealing said base plate to said second filter unit sealing means; and
   filter medium inserted in said inner cavity.

2. A rechargeable filter assembly as in claim 1 wherein said removable filter unit further comprises a filter medium having first and second peripheral edges, and wherein said first and second filter unit sealing means further comprises a first gasket and a second gasket such that said first peripheral edge of said filter medium is sealed to said first gasket and said second peripheral edge of said filter medium is sealed to said second gasket.

3. A rechargeable filter assembly as in claim 1 wherein said lid sealing means further comprises a band of roughened surface area of said lid adjacent to said lid aperture and adjacent to said shoulder of said conduit, such that when said lid is attached to said filter assembly said filter unit sealing means is squeezed between said roughened area of said lid and said shoulder of said conduit.

4. A rechargeable filter assembly comprising:
   a perforated conduit having a first and a second open end;
   a base plate affixed to said second end of said conduit, said base plate having a base aperture formed therethrough and said conduit being in fluid flow communication with said base aperture;
   a hollow perforated support cylinder having a first open end and a second open end, said support cylinder surrounding said conduit and spaced therefrom, said support cylinder and said conduit defining an inner cavity therebetween, and one of said ends of said support cylinder being removably attached to said base plate;
   a perforated cylindrical exterior shell having at least one open end, said exterior shell surrounding said support cylinder is removably connected to said base to define an outer cavity therebetween;
   a lid having a lid aperture therethrough, said lid removably attached to said first end of said conduit and removably connected to said support cylinder;
   a cylindrical filter unit having a first end and a second end, said filter unit having a first and second filter unit sealing means on said first and said second ends respectively, and said filter unit having an opening therethrough, said filter unit adapted to be removably inserted onto and around said support cylinder within said outer cavity, whereby said second sealing means of said filter unit is adjacent to said base plate and said first sealing means of said filter unit is adjacent to said lid of said filter assembly;
   a lid attaching means for removably attaching said lid to said conduit wherein said perforated conduit further comprises an annular slot proximal to said first end of said conduit;
   a lid sealing means for removably sealing said lid to said filter unit sealing means of said first end of said filter unit;
   a base plate sealing means for removably sealing said base plate to said filter unit sealing means of said second end of said filter unit; and
   filter medium inserted in said inner cavity.

5. A lid attaching means as in claim 4 wherein said lid aperture is larger than the circumference of said conduit proximal to said first end of said conduit such that said first end of said conduit may be inserted into said lid aperture, wherein said lid attaching means further comprises handles pivotally attached to said lid such that they are movable from an open position to a sealed position, said handles having a first end and a second end, when said first ends of said handles are in said sealed position, said first ends engage a segment of said annular slot of said conduit, whereby said lid is pressed downward against said filter unit and securely, removably, fastened to said conduit.

6. A rechargeable filter assembly comprising:

a reusable perforated conduit having a first and a second open end;

a base plate affixed to said second end of said conduit, said base plate having a base aperture formed therethrough and said conduit being in fluid flow communication with said base aperture;

a reusable hollow perforated support cylinder having a first open end and a second open end, said support cylinder surrounding said conduit and spaced therefrom, said support cylinder and said conduit defining an inner cavity therebetween, and one of said ends of said support cylinder being removably attached to said base plate;

a reusable perforated cylindrical exterior shell having at least one open end, said exterior shell surrounding said support cylinder is removably connected to said base to define an outer cavity therebetween;

a lid having a lid aperture therethrough, said lid removably attached to said first end of said conduit and removably connected to said support cylinder;

a cylindrical removable filter unit having a first end and a second end, said filter unit having a first and second filter unit sealing means on said first and said second ends respectively, and said filter unit having an opening therethrough, said filter unit adapted to be removably inserted onto and around said support cylinder within said outer cavity, whereby said second sealing means of said filter unit is adjacent to said base plate and said first sealing means is adjacent to said lid of said filter assembly;

a lid attaching means for removably attaching said lid to said conduit;

a lid sealing means for removably sealing said lid to said filter unit comprising a flange formed on said end of said support cylinder, such that when said filter unit is inserted over and around said support cylinder, said filter unit is sealing means of said first end of said filter unit rests upon said flange of said support unit and when said lid is placed over said conduit and pressed downward by said lid attaching means, said filter unit sealing means of said first end of said filter unit is sealingly squeezed between said lid and said flange, whereby fluid is prevented from bypassing said removable filter unit;

a base plate sealing means for removably sealing said base plate to said filter unit comprising a flange formed on each of said open ends of said exterior shell, such that when said filter unit is inserted within said outer cavity and said exterior shell is inserted over said filter unit, one of said flanges of said exterior shell annularly rests upon said filter unit sealing means of said second end of said filter unit, and when said lid is placed over said conduit and pressed downward by said lid attaching means, said filter unit sealing means of said second end of said filter unit is sealingly squeezed between said base plate and one of said flanges of said exterior shell, whereby fluid is prevented from bypassing said removable filter unit; and filter medium inserted in said inner cavity.

7. A rechargeable filter assembly as in claim 6, wherein said base plate further comprises a raised annular surface attached to said base, having an aperture therethrough, said aperture being in fluid flow communication with said base aperture and said second end of said conduit is attached to said annular surface such that said conduit is in fluid flow communication with said base aperture and said annular surface aperture.

8. A rechargeable filter assembly as in claim 6 wherein said lid aperture is larger than the circumference of said conduit such that said conduit projects through said lid aperture, wherein said lid attaching means comprises threads formed on said first end of said conduit and a nut threadably fastened to said threads on said conduit, whereby when said rechargeable filter assembly is assembled, said nut may be tightened against said lid to removably attach said lid to said filter assembly.

9. A rechargeable filter assembly as in claim 6 wherein said base further comprise an annular groove concentrically spaced between the peripheral edge of said base plate and said conduit such that when said second end of said support cylinder is positioned over said conduit and removably attached to said base, said support cylinder is inserted in said groove.

10. A rechargeable filter assembly as in claim 6 wherein said sealing means is comprised of polyester material.

11. A rechargeable filter assembly as in claim 6 wherein said filter medium comprises a pleated paper filter element.

12. A rechargeable filter assembly as in claim 6 wherein said base sealing means further comprises a band of roughened surface area of said base adjacent to the periphery of said base, such that said sealing means of said second end of said filter unit is sealingly squeezed between one of said flanges of said exterior shell and said roughened area of said base.

13. A rechargeable filter assembly as in claim 6 wherein said lid further comprises a band of roughened surface area of said lid spaced between the periphery of said lid and said lid aperture such that said sealing means of said first end of said filter unit is sealingly squeezed between said support cylinder flange and said roughened area of said lid.

* * * * *

UNITED STATES PATENT AND TRADEMARK OFFICE
CERTIFICATE OF CORRECTION

PATENT NO. : 5,015,375

DATED : May 14, 1991

INVENTOR(S) : Steven W. Fleck

It is certified that error appears in the above-identified patent and that said Letters Patent is hereby corrected as shown below:

Claim 6, column 11, line 36, please insert the word "first" at the beginning of line 36 before the word "end".

Claim 6, column 11, line 38, please delete the word "is".

Signed and Sealed this

First Day of December, 1992

Attest:

DOUGLAS B. COMER

Attesting Officer

Acting Commissioner of Patents and Trademarks